Patented Oct. 16, 1951

2,571,692

UNITED STATES PATENT OFFICE 2,571,692

FISHING ROD

Henri Dubois, Levallois, France, assignor, by mesne assignments, to Libbey-Owens-Ford Glass Company, Toledo, Ohio, a corporation of Ohio No Drawing. Application March 16, 1946, Serial No. 655,029. In France March 11, 1944

Section 1, Public Law 690, August 8, 1946
Patent expires March 11, 1964

12 Claims. (Cl. 43—18)

My invention relates to an improved form of fishing rod consisting of a hard resinous binder reenforced with longitudinal fibers, particularly fibers of glass.

A fishing rod intended for casting should fulfil a number of conditions. It should be sufficiently rigid so as not to bend unduly either under its own weight, or under the considerable applied force which it receives from the hand of the fisherman at the moment of making a cast. It should be elastic, i. e. it should return immediately and completely to its original form after having been bent. It should rapidly absorb any vibrations which may be imparted to it by the fisherman. It should be light to carry and to handle and thin so as to offer only a slight resistance to the wind. Its center of gravity should be as near the handle as possible. Finally it should be resistant to water, even sea water, and to weather conditions.

At present good fishing rods are generally made of bamboo strips glued together, and bound, if necessary. To obtain greater rigidity, the bamboo must be subjected to a preliminary treatment, for example immersion for several months in saline solutions. The rods are protected from the weather by careful varnishing.

I have found that certain synthetic materials are particularly well adapted, and better adapted than bamboo, for the manufacture of fishing rods.

The subject of the present invention is a fishing rod characterised in that it is made from a synthetic material composed of glass strands aligned parallel to one another and embedded in a binder which may be a synthetic resin of the phenol-formaldehyde type.

Such a synthetic material is known in itself. It is described for example in British Patent No. 502,409 of March 13, 1939, and in French Patent No. 855,731 of May 18, 1940.

Figure I of the drawing is a perspective view of a fishing rod embodying the invention made in three parts, in which the fishing rod is shown disassembled.

Figure II is a fragmentary transverse section on a greatly enlarged scale taken on the line II—II of Figure I.

These synthetic materials reinforced with parallel strands have a structure similar to that of the woods which are commonly used for the manufacture of fishing rods. The regularity of the strands is however much greater in the case of the synthetic materials. The positions of the fibers or unitary filar elements which compose the strands are moreover substantially parallel and in any case more nearly parallel than are the fibers of the woods used in making fishing rods. Moreover synthetic materials are free from knots, rings, exudations of resins and other defects met with in wood and consequently, there results a considerable reduction in the waste involved in the manufacture of fishing rods. The uniformity of the synthetic material offers the possibility of making rods therefrom having properties that are due solely to the dimensions of the rod and thereby free from the characteristics that arise due to the above mentioned defects.

While bamboo must be subjected to careful extended treatment so that it may become sufficiently rigid, synthetic materials may be produced throughout a range of moduli of elasticity suitable for the manufacture of fishing rods. The modulus of elasticity of synthetic materials depends in fact on the modulus of the binder on the one hand and of the filiform reinforcement on the other, in particular on the number of strands, their nature, their degree of twisting and tension. A material composed of strands tightly twisted, tensioned and embedded in a rigid binder, will have a higher modulus than a material composed of strands slightly twisted and only slightly tensioned and embedded in a flexible binder.

The use of glass fibers preferably of a thickness of less than 10 microns permits one to obtain materials more rigid than treated bamboo. A rod made of such a synthetic material may thus be thinner than a rod of treated bamboo while not bending more under a given applied force. It will thus offer less resistance to the wind while developing the same kinetic energy under the casting stroke of the fisherman.

The densities of the synthetic materials in question vary between 1.35 and 1.70. Although these densities may be slightly higher than that of treated bamboo, the greater rigidity of these synthetic materials, particularly the more dense material, which contain a high proportion of glass fiber, permits of producing from them rods which are not only thinner but also lighter and easier to handle.

Materials having a base of synthetic resins have the property of damping to a remarkable extent the vibrations which are transmitted to them and their power of absorption of vibrations is about 100 times greater than that of steel and twice greater than that of wood. Rods made of such a material may thus damp unintentional vibrations transmitted to them by the fisherman's hand.

The synthetic materials may be obtained by molding or other methods in the form of lengths of round or square section, and there is easily obtained starting from such blanks the desired rods or sections of rods by simple working operations. It is therefore not necessary to glue strips together as is the case in the production of a bamboo fishing rod.

As the synthetic materials are neither porous nor subject to deterioration, the varnishing of rods formed of these materials is only a matter of taste.

In one non-limitative embodiment of the present invention, a fishing rod intended for casting, will thus be formed of two or three lengths 10 of round section and of appropriate length fitting one within the other and forming together a rod the thickness of which diminishes progressively from one end to the other from 10 to one to two millimeters. The lengths are formed of a material composed of a synthetic resin 11 of the phenol-formaldehyde type in which is embedded a large number of parallel twisted glass strands 12, each of these twisted strands being formed of several hundreds of unitary glass fibers 13 of 4 to 5 microns diameter. This material has been subjected to molding under high pressure and at high temperature and the synthetic resin in it is thus in a polymerised state, i. e. infusible and insoluble. The glass strands are disposed parallel to the axis of the rod.

I claim:

1. A fishing rod comprising a group of strands of glass fiber material, each of said strands extending longitudinally along the axis of the rod and being composed of a plurality of glass fibers, said strands being maintained in their longitudinally extending relation throughout their lengths by a hard resinous binder, each of said strands and some of said fibers being secured to adjacent strands and adjacent fibers by said binder, said group of strands and the fibers therein being in closely assembled relation, and said rod diminishing in thickness from one end to the other.

2. A fishing rod as claimed in claim 1 wherein said strands are under tension.

3. A fishing rod as claimed in claim 1 wherein said glass fibers have a thickness less than ten microns.

4. A fishing rod as claimed in claim 1 wherein said strands are twisted.

5. A fishing rod as claimed in claim 1 that is composed of sectional lengths secured together.

6. A fishing rod comprising a plurality of glass fibers extending longitudinally along the axis of the rod and embedded in a hard resinous binder, said fibers being secured in closely assembled relation and maintained in their longitudinally extending relation throughout their lengths by said binder, and said rod diminishing in thickness from one end to the other.

7. A fishing rod as claimed in claim 6 wherein said glass fibers are under tension.

8. A fishing rod as claimed in claim 6 wherein said glass fibers have a thickness less than ten microns.

9. A method of producing a fishing rod that comprises the steps of assembling a group of strands of glass fiber material so that the cross section of the assembly is a substantially regular geometric form and the strands extend longitudinally all in substantially the same direction, maintaining the strands in such relation, adhesively binding the strands and progressively diminishing the thickness of the assembly from one end to the other while the strands are bound in fixed relation to one another.

10. A method as claimed in claim 9 wherein the thickness of the assembly is progressively diminished from one end to the other after the strands have been bound in fixed relation to one another.

11. A fishing rod as claimed in claim 1 wherein the binder is a hardened thermosetting resin.

12. A fishing rod as claimed in claim 6 wherein the binder is a hardened thermosetting resin.

HENRI DUBOIS.

REFERENCES CITED

The following references are of record in the file of this patent:

UNITED STATES PATENTS

| Number | Name | Date |
|---|---|---|
| 240,354 | Allen | Apr. 19, 1881 |
| 244,619 | King | July 19, 1881 |
| 499,779 | Cable | June 20, 1893 |
| 1,073,260 | Long | Sept. 16, 1913 |
| 1,323,039 | Fredrick | Nov. 25, 1919 |
| 1,748,354 | Laing | Feb. 25, 1930 |
| 1,956,721 | Kennedy | May 1, 1934 |
| 2,184,326 | Thomas | Dec. 26, 1939 |
| 2,196,033 | Schuhmann | Apr. 2, 1940 |
| 2,210,432 | Roesch | Aug. 6, 1940 |
| 2,234,560 | Keyes | Mar. 11, 1941 |
| 2,245,824 | Roesch | June 17, 1941 |
| 2,260,024 | Hall et al. | Oct. 21, 1941 |
| 2,293,918 | Planiol | Aug. 25, 1942 |
| 2,354,110 | Ford et al. | July 18, 1944 |
| 2,392,805 | Biefeld | Jan. 15, 1946 |

FOREIGN PATENTS

| Number | Country | Date |
|---|---|---|
| 490,935 | Great Britain | Aug. 23, 1938 |
| 760,022 | France | Dec. 6, 1933 |

OTHER REFERENCES

Modern Plastics, May 1943, pp. 100 and 130, "Plastic-Bonded Cotton Fiber" by M. A. Goldman and G. A. Olsen.

Modern Plastics, May 1944, pp. 100–103; "Forms, Properties and Handling of Glass Reinforcements," by Games Slayter et al.

Modern Plastics, February 1946, pp. 124, 125.

Certificate of Correction

Patent No. 2,571,692     HENRI DUBOIS     October 16, 1951

It is hereby certified that error appears in the above numbered patent requiring correction as follows:

In the heading to the printed specification, line 7, strike out "No Drawing.".
The drawing containing Figures I and II, as shown below, should be inserted as part of the Letters Patent—

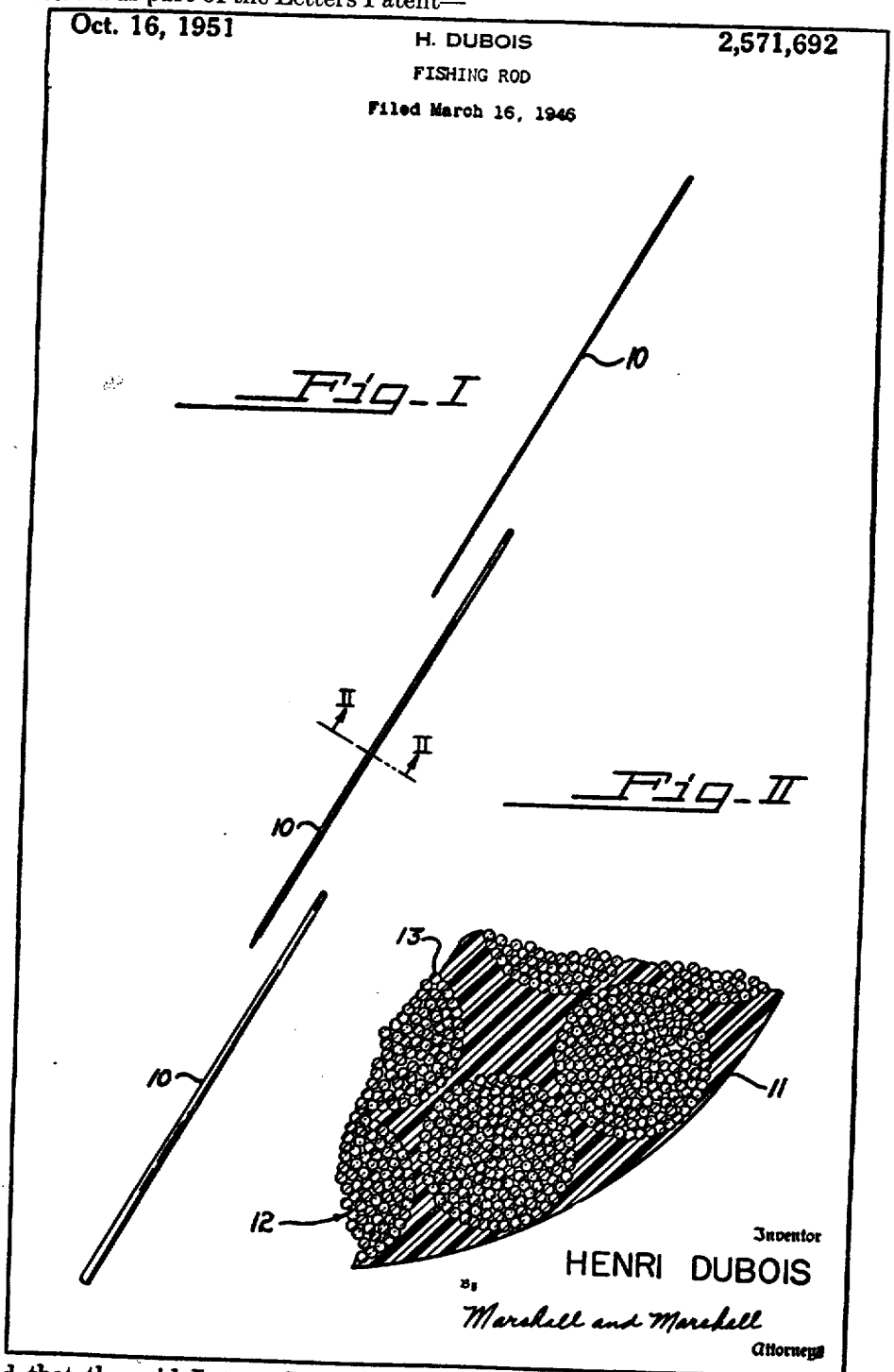

and that the said Letters Patent should be read as corrected above, so that the same may conform to the record of the case in the Patent Office.

Signed and sealed this 11th day of December, A. D. 1951.

[SEAL]

THOMAS F. MURPHY,